June 30, 1964  J. C. FREEBORN  3,139,562

VOLTAGE MONITORING CIRCUIT

Filed Oct. 17, 1960

INVENTOR.
JOHN C. FREEBORN
BY *Alfred N. Feldman*

ATTORNEY

United States Patent Office 3,139,562
Patented June 30, 1964

3,139,562
VOLTAGE MONITORING CIRCUIT
John C. Freeborn, Richfield, Minn., assignor to Minneapolis-Honeywell Regulator Company, Minneapolis, Minn., a corporation of Delaware
Filed Oct. 17, 1960, Ser. No. 63,032
15 Claims. (Cl. 317—148.5)

The present invention is directed to a circuit capable of monitoring a variable voltage and operating an associated control device within a fixed pair of limits. More specifically, the present invention is directed to a circuit which is capable of sensing a rising voltage and which will energize a relay upon the voltage reaching a first predetermined level. If the voltage continues to rise, and leaves a range by increasing above a second predetermined voltage level, the relay is then dropped back out or deenergized. The invention presently disclosed provides a means for controlling a device within a predetermined range thereby eliminating the need for two voltage sensitive relays which would be capable of first being energized and then causing the deenergization of the circuit upon a continuing rise as has been more normally accomplished.

Broadly, the present circuit incorporates a pair of transistors that are controlled along two separate voltage curves. The two separate voltage curves are obtained by utilizing two control circuits each incorporating a Zener diode, wherein the Zener diodes have different breakdown potentials. By applying a voltage that is varying to the circuit, one of the transistors is allowed to conduct in conjunction with a voltage divider network which incorporates the first Zener diode thereby turning on the other transistor which in turn energizes a control relay or device. As the input voltage to the circuit continues to rise the second Zener diode breakdown occurs thereby changing the slope of the curve to which the transistors respond. This change in slope causes the second transistor to be biased off thereby dropping out the relay at the second predetermined control voltage.

It is therefore the primary object of the present invention to disclose a voltage monitoring circuit which is capable of controlling a device, such as a relay, between two predetermined voltage levels.

It is a further object of the present invention to disclose a highly simplified transistor circuit that utilizes the characteristics of Zener diodes to trigger the response of a control device within two predetermined input signal levels.

These and other objects will become apparent when the presently disclosed circuit is explained in detail along with a graph of typical voltages that appear in the circuit.

Figure 1:
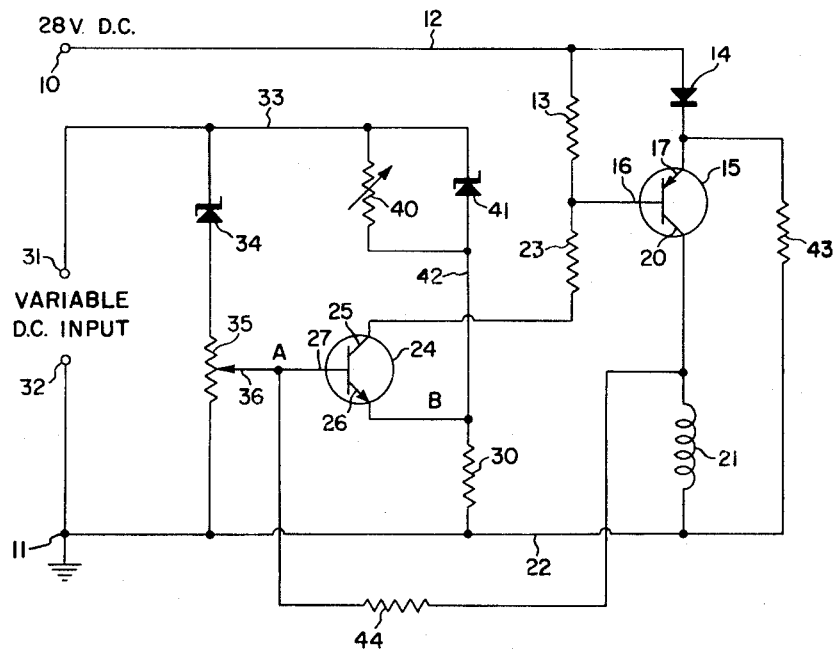
Figure 2:
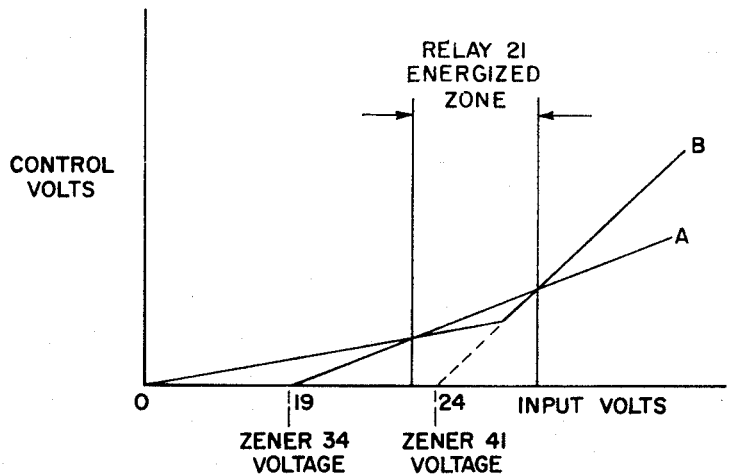

FIGURE 1 of the present disclosure is a simplified schematic representation of a typical circuit, and;

FIGURE 2 is a graphic representation of voltages that appear in the circuit of FIGURE 1 and which explain the operation of the unique circuit.

In the circuit of FIGURE 1, a fixed energizing means in the form of a 28 volt supply is disclosed between terminal 10 and ground 11. Terminal 10 is connected by lead 12 to a resistor 13 and an ordinary diode 14 which make up the input circuit to a current control means 15, disclosed as a PNP transistor. A base 16 of the transistor 15 is connected to one end of resistor 13, while an emitter 17 is connected to the diode 14 so that they both conduct in the same direction. A collector 20 of transistor 15 is connected to a controlled device or relay 21 shown in the form of a relay coil. The relay coil 21 is connected to the ground 11 by conductor 22.

Extending from the junction of resistor 13 and the base 16 of transistor 15 is a resistor 23, which in conjunction with a current control means 24 or transistor of the NPN type, make up a voltage divider network along with resistor 30 which is connected to the ground conductor 22. The NPN transistor 24 has a collector 25 connected to the resistor 23 while an emitter 26 is connected to the resistor 30. A base 27 of transistor 24 forms part of an input circuit that will be subsequently described.

A direct current variable voltage input or signal is supplied between terminals 31 and 32 to control the relay 21 between two limits which are established by the circuit parameters. An explanation of how this is accomplished will appear after an explanation of the circuit components. Terminal 32 is connected to ground 11 while terminal 31 is connected to a common conductor 33. The conductor 33 has a Zener diode 34 connected to an impedance means 35 disclosed as a potentiometer or other form of resistance means. One side of potentiometer 35 is connected in turn to ground. The Zener diode 34 has a breakdown characteristic voltage of approximately 19 volts in the present circuit. A tap 36 of the potentiometer 35 is connected to the base 27 of the transistor 24 thereby forming part of the input circuit to the transistor 24. The basic input circuit to transistor 24 is made up of the portion of potentiometer 35 between the base 27 and resistor 30 which is connected to the emitter 26. Also connected between the conductor 33 and the transistor 24 are a parallel combination of a variable impedance means or resistance means 40 and a second Zener diode 41 which has a breakdown characteristic voltage of about 24 volts. The parallel combination of the resistance means 40 and the Zener diode 41 are connected by a conductor 42 to the junction of the emitter 26 and the resistance 30. Impedance means 35 and 40 are shown as variable, but can be of fixed values if the circuit is used for only one set of voltage control limits.

The balance of the circuit components make up a biasing means and a feedback means for the present circuit and encompass a resistance 43 that is connected from the emitter 17 of transistor 15 to ground, and a resistance 44 that is connected from the collector 20 of transistor 15 to the base 27 of the NPN transistor 24. The purpose of these two resistors will become apparent in connection with the discussion of operation of the circuit.

*Operation*

The operation of the present circuit will be described in reference both to FIGURE 1 and the graphical representation of the voltages appearing in the graph as disclosed in FIGURE 2. Basically the graph in FIGURE 2 is a comparison of two control voltages at the points A and B in FIGURE 1, and are referenced in the graph of FIGURE 2 as curves A and B. The control volts are plotted against the variable input volts between the terminals 31 and 32. The relay 21 is energized in the noted range and is deenergized both below and above the range specified thereby giving the unique function of the present invention.

If a variable direct current voltage is considered as applied between terminals 31 and 32, and it is considered starting from 0 and gradually increasing, the operation of the circuit can most readily be explained. As the voltage on conductor 33 gradually increases there is a tendency for current to want to flow through the Zener diode 34 and through the parallel combination of the resistor 40 and Zener diode 41. Since both Zener diodes 34 and 41 have substantial breakdown voltages no current in effect flows through either of these diodes. As such the wiper 36 of the potentiometer 35, for all practical purposes, is at ground potential. A slight amount of current will flow through the circuit composed of the impedance means or resistor 40 along with the resistor 30. This, when considered in terms of FIGURE 2, represents the beginning ends of both of the curves A and B. Specifically considering the curve A, it will be noted that since no current flows in the circuit composed of the Zener diode 34 and the impedance means 35 that, the potential at point A remains substantially 0 at the outset of the variable voltage input rise. Since the voltage rise causes a continuously increasing current through the impedance means 40 and the resistance 30, the curve representing the voltage of curve B gradually increases along the upper curve from 0 to some potential. When the voltage appearing at conductor 33 reaches 19 volts, noted on the curve of FIGURE 2 as the first Zener diode breakdown voltage, it is noted that the curve for the voltage at A changes and starts to rise. The slope of the rise is a function of the percent of the resistance between the wiper 36 and ground and the total resistance in the impedance means 35. Since the Zener diode 34 in effect has a constant voltage drop of 19 volts across it, it can be seen that as the input voltage rises above 19 volts, the curve A has a slope that is determined by the portion of the resistance that appears between the wiper 36 and ground.

As the input voltage continues to rise, the voltage of curve A will rise along a fixed line which intercepts curve B. As soon as the voltage of curve A equals or exceeds the voltage of curve B, the NPN transistor 24 has a sufficient input voltage to turn the transistor "on." As long as the voltage at point A in FIGURE 1 exceeds the voltage at point B, the transistor 24 will conduct thereby causing current to flow through the resistors 13, 23, and 30. The flow of current through this voltage divider network then applies an input voltage to the transistor 15 by applying the voltage between the emitter 17 and the base 16. The voltage drop occurring across resistor 13 immediately causes the transistor 15 to conduct thereby causing current to flow through the diode 14, the transistor 15, and the relay 21. This immediately pulls the relay in. It should be noted at this point that the diode 14 and the resistance 43 have been conducting some slight amount during the operating period and are used as a bias means to keep the transistor 15 completely cut "off" until the transistor 24 is definitely switched "on" thereby applying a definite voltage to resistor 13 on the input of the transistor 15.

As the variable direct current voltage applied between terminals 31 and 32 increases, the voltage on conductor 33 increases until the breakdown potential of the Zener diode 41 is reached. As soon as the breakdown potential of the Zener diode 41 is reached, the voltage along curve B will change and it will begin to rise along with the input voltage to the circuit. This changes the slope of curve B to follow the curve as shown in FIGURE 2, which intercepts curve A once again at the edge of the zone noted as "Relay 21 Energized Zone." As the voltage appearing on conductor 33 continues to rise the voltage appearing across resistor 30 will increase to a point where it exceeds the voltage appearing at the input of transistor 24 thereby cutting transistor 24 "off." As soon as the transistor 24 is cut "off" and ceases to conduct, the voltage divider network formed of the resistor 13, 23, and 30 ceases to supply a voltage across the resistance 13 to the input of the transistor 15. This then immediately cuts the transistor 15 "off" thereby dropping relay 21 back out of the circuit.

The resistor 44, which is connected between the relay 21 and point A supplies a feedback voltage that keeps the transistor 24 on as long as voltage is being dropped across the relay coil 21. This feedback circuit is used as a stabilizing means for the system and provides a slight current to make the unit "snap acting" to avoid a half "on" or half "off" condition.

The circuit described provides an unusual control function in that a relay or similar device is first turned "on" as a progressively rising voltage is applied, and is then turned "off" at a fixed potential as the voltage input continues to rise. It will thus be seen that with the circuit described in FIGURE 1, the relay 21 will remain energized at all times when the voltage appearing across terminals 31 and 32 falls anywhere in the zone marked in FIGURE 2 as the "Relay 21 Energized Zone." At any time the voltage either falls below this zone or rises above the zone the relay will drop out. This circuit therefore provides a unique function that is not normally available in conventional relay circuitry and provides for a means of monitoring an input voltage by means of a relay. While the present invention has been specifically described in connection with a relay the invention could be applied to other types of devices. Also the present circuitry has been highly simplified to show a basic transistor arrangement capable of utilizing the breakdown potential of the two Zener diodes, but it is noted that additional circuitry in the form of transistor amplification could be utilized by properly selecting the type of transistor used and the number of cascaded circuit elements to give the same function. In view of the many variations that are possible with the principle described in connection with the above circuit and graph, the applicant wishes to be limited in the scope of his invention only to the scope of the appending claims.

I claim as my invention:

1. In a direct current voltage monitoring circuit for control of a relay between two established voltage control limits: a first transistor having an input circuit and an output circuit wherein said output circuit is in series with a relay and fixed energizing means, said output circuit including bias means; a second transistor having an input circuit and an output circuit wherein said second transistor output circuit is in series with a voltage divider network across said fixed energizing means; feedback means connecting said relay and said second transistor input circuit; said first transistor input circuit operated in parallel with a part of said voltage divider network so that said second transistor output circuit controls said first transistor output circuit by varying the first transistor input circuit when said bias means is overcome; a variable direct current signal input voltage to which said relay is to respond when said input voltage is between first and second established control limits; a Zener diode and a first resistor in parallel with said input voltage and said first resistor being a part of said input circuit to said second transistor; and a second resistor and a second Zener diode connecting said input voltage to said voltage divider network at said output circuit of said second transistor, said input voltage controlling the output of said transistors and said relay in response to the voltages at said first resistor and said voltage divider network so that said relay is first energized at said first control limit and then deenergized as said input voltage is raised to said second control limit, said first transistor being controlled by the proportions of the voltages at said first resistor compared to that of the voltage divider network.

2. In a direct current voltage monitoring circuit for control of a relay between two established voltage control limits: a first transistor having an input circuit and an output circuit wherein said output circuit is in series with a relay and fixed energizing means; a second transistor having an input circuit and an output circuit wherein said second transistor output circuit is in series with a voltage divider network across said fixed energizing means, said first transistor input circuit operated in parallel with a part of said voltage divider network so that said second transistor output circuit controls said first transistor output circuit by varying the first transistor input circuit; a variable direct current input voltage to which said relay is to respond when said input voltage is between first and second established control limits; a Zener diode and resistance means in parallel with said input voltage and said resistance means being a part of said input circuit to said second transistor; and a resistor and a second Zener diode connecting said input voltage to said voltage divider network at said output circuit of said second transistor, said input voltage controlling the output of said transistors and said relay in response to the voltages at said resistance means and said voltage divider network so that said relay is first energized at said first control limit and then deenergized as said input voltage is raised to said second control limit, said first transistor being controlled by the proportions of the voltages at said resistance means compared to that of the voltage divider network.

3. In a voltage monitoring circuit for control of a device between two established voltage control limits: first transistor means having an input circuit and an output circuit wherein said output circuit is in series with a device and fixed energizing means; second transistor means having an input circuit and an output circuit wherein said second transistor means output circuit is in series with a voltage divider network across said fixed energizing means, said first transistor means input circuit operated in parallel with a part of said voltage divider network so that said second transistor means output circuit controls said first transistor means output circuit by varying the first transistor means input circuit; a variable input voltage to which said device is to respond when said input voltage is between first and second established control limits; a Zener diode and first impedance means in parallel with said input voltage and said first impedance means being a part of said input circuit to said second transistor means; and a second impedance means and a second Zener diode connecting said input voltage to said voltage divider network at said output circuit of said second transistor means, said input voltage controlling the output of said first transistor means and said device in response to the voltages at said first impedance means and said voltage divider network so that said device is first energized at said first control limit and then deenergized as said input voltage is raised to said second control limit.

4. In a voltage monitoring circuit for control of a device between two established voltage control limits: first current means having an input circuit and an output circuit wherein said output circuit is in series with a device and fixed energizing means; second current control means having an input circuit and an output circuit wherein said second current control means output circuit is in series with a voltage divider network across said fixed energizing means; said first current control means input circuit operated in parallel with a part of said voltage divider network so that said second current control means output circuit controls said first current control means output circuit by varying the first current control means input circuit; a variable input voltage to which said device is to respond when said input voltage is between first and second established control limits; a Zener diode and first impedance means in parallel with said input voltage and said first impedance means being a part of said input circuit to said second current control means; and a second impedance and a second Zener diode connecting said input voltage to said voltage divider network at said output circuit of said second current control means, said input voltage controlling the output of said first current control means and said device in response to the voltages at said first impedance means and said voltage divider network so that said device is first energized at said first control limit and then deenergized as said input voltage is raised to said second control limit.

5. Control apparatus for providing an output condition between first and second predetermined input conditions comprising, in combination:
  means for supplying a first input signal;
  first zener means for supplying a second input signal, said first zener means being connected across said means for supplying the first input signal;
  first current control means connected to receive said second input signal when said first input signal becomes greater than an amount established by said first zener means;
  second current control means connected to a device for placing said device in first and second conditions, said device normally being in the first condition;
  second zener means for supplying a third input signal connected across said means for supplying the first input signal;
  means for supplying said third input signal to said first current control means, said third signal allowing an output from said first current control means when said second signal is of a larger magnitude than said third signal, and said first and second zener means having non-linearities such that said second signal is of a greater magnitude than said third signal between the first and second predetermined input conditions;
  and means for supplying said output of said first current control means to said second current control means to place said device in said second condition when said output from said first current control means is received by said second current control means.

6. Control apparatus for providing an output condition between first and second predetermined input conditions comprising, in combination:
  means for supplying a first input signal;
  first voltage reference means connected across said means for supplying the first input signal, and adapted to supply a second input signal;
  first current control means connected to receive said second input signal from said voltage reference means when said first input signal becomes greater than a predetermined magnitude, said magnitude being established by said first voltage reference means;
  second current control means connected to a device for placing said device in first and second conditions, said device normally being in the first condition;
  second voltage reference means for supplying a third input signal connected across said means for supplying the first input signal;
  means for supplying said third input signal to said first current control means, said third signal allowing an output from said first current control means when said second signal is of a larger magnitude than said third signal, and said first and second voltage reference means having non-linearities such that said second signal is of a greater magnitude than said third signal between the first and second predetermined input conditions;
  and means for supplying said output of said first current control means to said second current control means to place said second current control means in said second condition when a signal is received by said second current control means.

7. Control apparatus for supplying a condition between first and second magnitudes of an input signal comprising, in combination:
  means for supplying a first input signal;
  first zener means and first resistance means connected in series across said means for supplying the input signal, said series connection providing a non-linear first signal as compared to the input signal;
  second zener means and second resistance means connected across said means for supplying the input signal, said second zener means and said second resistance means providing a non-linear second signal as compared to the input signal, said first and second signals being characterized such that said first signal is of a greater magnitude than said second signal between the first and second magnitudes of the input signal;
  and transistor means including input and output means for providing an output signal between said first and second magnitudes of the input signal.

8. Control apparatus for supplying a condition between first and second magnitudes of an input comprising, in combination:
  means for supplying an input signal;
  first voltage reference means and first resistance means connected in series across said means for supplying the input signal, said series connection providing a non-linear first signal as compared to the input signal;

second voltage reference means and second resistance means connected across said means for supplying the input signal, said second voltage reference means and said second resistance means providing a non-linear second signal as compared to the input signal, said first and second signals being characterized such that said first signal is of a greater magnitude than said second signal between the first and second magnitudes of the input;

and current control means including input and output means for providing an output between said first and second magnitudes of the input.

9. Apparatus for providing a control function between first and second selected input conditions comprising, in combination:

means for supplying a control signal;

first and second zener means connected across said means for supplying the control signal, said first and second zener means being adapted to supply first and second input signals respectively, said first input signal being of a greater magnitude than said second input signal between the first and said second selected input condition;

transistor means connected to receive said first and second input signals and adapted to provide an output when said first input signal is of a greater magnitude than said second input signal;

and a device connected to receive said output from said transistor means and adapted to provide the control function between said first and second selected input conditions.

10. Apparatus for providing an output signal between first and second selected input voltages comprising, in combination:

means for supplying a control voltage;

first and second voltage reference means connected across said means for supplying the control voltage, said first and second voltage reference means being adapted to supply first and second input signals respectively, said first input signal being of a greater magnitude than said second input signal between the first and said second selected input voltages;

voltage responsive means connected to receive said first and second input signals and adapted to provide an output when said first input signal is of a greater magnitude than said second input signal;

and a device connected to receive said output from said voltage responsive means and adapted to provide the output signal between said first and second selected input voltages.

11. Apparatus for providing a control function between first and second selected input conditions comprising, in combination:

means for supplying a control signal;

first and second voltage reference means connected across said means for supplying the control signal, said first and second voltage reference means being adapted to supply first and second input signals respectively, said first input signal being of a greater magnitude than said second input signal between the first and said second selected input conditions;

current control means connected to receive said first and second control signals and adapted to provide an output when said first input signal is of a greater magnitude than said second input signal;

and a device connected to receive said output from said current control means and adapted to provide the control function between said first and second selected input conditions.

12. Apparatus for providing an output between first and second selected input conditions comprising, in combination:

means for supplying a control signal;

first and second voltage reference means connected across said means for supplying the control signal, said first and second voltage reference means being adapted to supply first and second input signals respectively, said first input signal being of a greater magnitude than said second input signal between the first and said second selected input conditions;

and current control means connected to receive said first and second control signals and adapted to provide the output when said first input signal is of a greater magnitude than said second input signal.

13. Voltage monitoring apparatus comprising, in combination:

transistor means including base, emitter and collector means;

first means for supplying a control signal;

power supplying means;

reference potential means;

load means connected between said power supplying means and said collector means;

first voltage dividing means connected between said first means and said reference potential means, said first voltage dividing means including first zener diode means for inducing nonlinearities in a first output signal;

second means connecting said base of said transistor means to said first voltage dividing means for receiving said first output signal therefrom;

second voltage dividing means connected between said first means and said reference potential means, said second voltage dividing means including second zener diode means for inducing nonlinearities in a second output signal, and said second output signal being of lesser amplitude with respect to said reference potential means than said first output signal only between predetermined limits of said control signal; and third means connecting said emitter of said transistor means to said first voltage dividing means for receiving said second output signal therefrom.

14. Voltage monitoring apparatus comprising, in combination:

transistor means including base, emitter and collector means;

first means for supplying a control signal;

power supplying means;

reference potential means;

load means connected between said power supplying means and said collector means;

first voltage dividing means connected between said first means and said reference potential means, said first voltage dividing means including first zener diode means for inducing nonlinearities in a first output signal;

second means connecting said base means of said transistor means to said first voltage dividing means for receiving said first output signal therefrom;

second voltage dividing means connected between said first means and said reference potential means, said second voltage dividing means including zener diode means for inducing nonlinearities in a second output signal; and third means connecting said emitter means of said transistor means to said first voltage dividing means for receiving said second output signal therefrom.

15. Voltage monitoring apparatus comprising, in combination:

amplifying means including control, common and output means;

first means for supplying a control signal;

power supplying means;

reference potential means;

load means connected between said power supplying means and said output means of said amplifying means;
first voltage dividing means connected between said first means and said reference potential means, said first voltage dividing means including first voltage reference means for inducing nonlinearities in a first output signal;
second means connecting said control means of said amplifying means to said first voltage dividing means for receiving said first output signal therefrom;
second voltage dividing means connected between said first means and said reference potential means, said second voltage dividing means including second voltage reference means for inducing nonlinearities in a second output signal; and
third means connecting said common means of said amplifying means to said first voltage dividing means for receiving said second output signal therefrom.

References Cited in the file of this patent

UNITED STATES PATENTS

| | | |
|---|---|---|
| 2,942,123 | Schuh | June 21, 1960 |
| 2,945,174 | Hetzler | July 12, 1960 |
| 3,041,469 | Ross | June 26, 1962 |

OTHER REFERENCES

Holec: "Overvoltage Protection of DC Supply Lines," Electronic Design, page 46, May 27, 1959.